United States Patent
Jansens et al.

(10) Patent No.: US 6,890,441 B2
(45) Date of Patent: May 10, 2005

(54) HYDRAULIC ANNULAR WASHING COLUMN, AND PROCESS FOR SEPARATING SOLIDS FROM A SUSPENSION

(75) Inventors: Pieter Johannes Jansens, Bergschenhoek (NL); Johannes de Graauw, Zoetermeer (NL)

(73) Assignee: NIRO Process Technology B.V., Hertogenbosch (NL)

( * ) Notice: Subject to any disclaimer, the term of this patent is extended or adjusted under 35 U.S.C. 154(b) by 0 days.

(21) Appl. No.: 10/804,200

(22) Filed: Mar. 19, 2004

(65) Prior Publication Data

US 2005/0006318 A1 Jan. 13, 2005

Related U.S. Application Data

(63) Continuation of application No. PCT/NL02/00598, filed on Sep. 19, 2002.

(30) Foreign Application Priority Data

Sep. 19, 2001 (EP) .............................................. 01203549

(51) Int. Cl.$^7$ .......................... B01D 29/76; B01D 29/78
(52) U.S. Cl. ....................... 210/634; 210/767; 210/769; 210/772; 210/774; 210/801; 210/803; 210/175; 210/256; 210/408; 210/413; 210/433.1; 210/513; 210/532.1
(58) Field of Search ................................ 210/634, 767, 210/768, 769, 772, 774, 800, 801, 802, 803, 175, 256, 407, 408, 413, 433.1, 513, 532.1

(56) References Cited

U.S. PATENT DOCUMENTS

| | | | |
|---|---|---|---|
| 2,862,797 A | | 12/1958 | McKay |
| 3,298,950 A | * | 1/1967 | Mindler ..................... 210/676 |
| 3,319,437 A | | 5/1967 | Goins |
| 3,807,202 A | * | 4/1974 | Gunkel .................... 68/181 R |
| 4,038,178 A | * | 7/1977 | Hukki ....................... 209/161 |
| 4,734,102 A | | 3/1988 | Thijssen |
| 5,622,321 A | * | 4/1997 | Brundiek et al. ......... 241/79.1 |
| 6,079,567 A | * | 6/2000 | Gray ........................... 209/44 |

OTHER PUBLICATIONS

PCT/NL02/00598 International Search Report w/Examined claims attached.

* cited by examiner

Primary Examiner—Robert James Popovics
(74) Attorney, Agent, or Firm—Womble Carlyle

(57) ABSTRACT

An apparatus for separating solids from a suspension includes a hollow cylindrical column having a central axis therethrough. The column has an interior with a cross-section, perpendicular to said axis, that is constant along said axis, and that extends from a first end to a second end of the column; one central tube axially disposed in said column and extending from said one end toward said opposite end, said central tube having an outer wall of constant diameter, said cylindrical column and said central tube defining an annular zone between them, extending axially from said first end of the column to at least near said second end of the column; at least one filter in said outer wall of the said central tube, forming the only direct communication between the said annular zone and the interior of the tube and at least one filter in the outer wall.

29 Claims, 1 Drawing Sheet

HYDRAULIC ANNULAR WASHING COLUMN, AND PROCESS FOR SEPARATING SOLIDS FROM A SUSPENSION

RELATED APPLICATIONS

This is a Continuation of international application no. PCT/NL02/00598, filed 19 Sep. 2002, which designated the U.S., published in English as WO 03/024562 on 27 Mar. 2003, and whose contents are incorporated by reference.

FIELD OF THE INVENTION

The invention is directed to a hydraulic washing column for separating solids from suspensions.

BACKGROUND OF THE INVENTION

Separating solids from suspensions, optionally combined with washing of the solids in hydraulic washing columns is a well known technique for concentration of food products (coffee extract, juices), for recovering crystals in pure form from suspensions, for desalination of sea water, and the like.

An apparatus for concentrating a suspension is known from U.S. Pat. No. 2,854,494. This patent describes a crystal wash column in which in a cylindrical room a crystal suspension is concentrated by directing this suspension along a section of the cylindrical wall which contains one or more filters. At least a substantial portion of the liquid in the suspension is removed through these filters. The crystals substantially rid of liquid, thus in a concentrated suspension, are transferred along the filters and removed by a way different from that of the liquid. In this known apparatus the liquid and the crystals of the suspension to be treated initially move in the same direction. Via the filters mounted in the wall, however, the greater part of the liquid is removed sideways, while the crystals continue to move in the same direction.

A disadvantage of this hydraulic washing column resides therein, that it is very difficult to develop a column based on this principle suitable for large scale commercial operation. More in particular, with column sizes of over about 75 cm diameter, problems may occur with respect to pressure build-up and homogeneity of the wash/separation front, depending, among others, on the nature of the solid material and/or the particle size and shape thereof.

More in particular in the neighbourhood of the filter a densely packed crystal bed is formed, on which a big force has to be exercised for its transfer due to the fact that the friction between such a packed bed and the wall of the column can become very considerable with larger column diameters, due to the increasing radial pressure gradient. In other words, the ratio between friction forces and transport forces increases. This big force exercised on the concentrated suspension involves the compression of the packed bed, which can result in deforming or damaging the crystals. The consequence thereof is a further increase in pressure drop and a decrease in throughput capacity of the column. Further an increased energy consumption may be the consequence too.

A further disadvantage of this known apparatus is that a homogeneous flow of washing liquid through the crystal bed becomes more difficult with increasing column diameter. Since the filters are located in the column wall in the neighbourhood of the filters there is not an evenly distributed axial liquid flow, but an increased radial liquid flow directed towards the filter. This disturbing effect of the filters mounted in the wall on the liquid flow in the crystal bed increases with a larger column diameter and results in an uneven profile of the washing front.

In U.S. Pat. No. 4,735,781 a further development of this known column is described, which development consists of the provision of a number of filter tubes inside the treatment zone.

In a column of the type described in U.S. Pat. No. 4,735,781 extrapolation of the literature data shows, that typically about 300 tubes of 2 cm would be required for a 110 cm diameter column.

It is well known, that the presence of tubes in a packed bed of solids leads to a disturbance thereof. As a result, bridge formation and channelling can occur in the bed. Also the increased wall surface area leads to increased friction forces, as discussed above.

Further problems encountered with this construction are that a homogeneous distribution of the slurry over the entire cross-section of the column is difficult, leading to that it is difficult to create a homogeneous bed, and that is it difficult to perform an accurate measurement of the bed height.

Finally it is to be noted the tubes require very narrow dimensional tolerance and precise positioning, which aspects, together with the increased amounts of materials, make the column more expensive to construct.

Quite likely those are the reasons that up to now this column has never been demonstrated successfully on an industrial scale.

SUMMARY OF THE INVENTION

The object of the invention is to provide an apparatus for the concentration of a suspension of solids in a liquid which apparatus does not have the disadvantages mentioned above, or at least only in a substantially reduced measure. In the context of the present invention the terms solids, crystals and particles are used to indicate the same, unless indicated differently.

The invention is based on the insight, that by providing a centrally located inner cylinder provided with at least one filter in the wall of said cylinder, in combination with at least one filter in the wall of the outer column, it has been found possible to optimise the distance that the liquid has to travel to reach the filters, while at the same time preventing or at least reducing the problems inherent to the known columns.

Accordingly the invention is directed to a hydraulic annular washing column for continuously separating solids from a suspension comprising:

a hollow cylindrical column having a central axis therethrough, said column having an interior with a cross-section, perpendicular to said axis, that is constant along said axis, and that extends from a first end to a second end of the said column, one central cylinder axially disposed in said column and extending from said one end toward said opposite end, said central cylinder having an outer wall of constant diameter, said cylindrical column and said central cylinder defining an annular zone between them, extending axially from said first end of the column to at least near said second end of the column;

at least one filter in said outer wall of the said central cylinder, forming the only direct communication between the said annular zone and the interior of the cylinder and at least one filter in the outer wall of said hollow cylindrical column;

means for supplying a suspension to said first end of the column;

means for removing suspension at said second end of the column;

said annular zone defining a concentration zone and optionally a washing zone;

means communicating with the interior of said central cylinder for removing liquid passed through said filter in said outer wall of the said central cylinder and means for removing liquid passed through filter in the outer wall of said hollow cylindrical column;

hydraulic means, continuously acting on the suspension for urging the liquid through said annular zone towards said filters and for forming a packed bed of solids moving continuously in axial direction towards said second end.

The location of the filters in the wall of the central cylinder and the wall of the outer column can be varied to obtain an optimal function of the column. More in particular it is possible to use one filter in the central cylinder and the outer wall, but it also possible to have more filters in the outer wall and/or in the central cylinder. The height of the filters can also be different in the central cylinder and the outer wall. It is not necessary to have the filters on the same location in respect to the length of the column. All these aspects may be used to obtain a homogeneous packed bed and/or a homogeneous wash front. These can also be used to reduce the friction in the bed and/or to balance the friction between the bed and the central cylinder on the one hand and between the bed and the outer wall on the other hand. Another aspect of the operation of the column that can be used to obtain an optimal operation, is the withdrawal of the filtrate. By varying the withdrawal rate through the various filters (i.e. by control valves in the lines) it is possible to influence the pressure profile in the packed bed near the filters. More in particular by the possibility to control the liquid flow through the filters in the central cylinder and in the outer wall independently from each other, it is possible to control the radial pressure gradient and thereby to create an optimal packed bed in terms of homogeneity of the bed near the filters. Also the homogeneity of the wash front downstream of the filters can be controlled by this feature. The control of the liquid flow can be done using known means such as valves or restricting orifices.

In case multiple filters are present in a wall at different locations along the length of the column, it can be advantageous to control the flow through each filter independently. In such a case the highest filters can be used to create the bed.

With these measures, of course combined with a careful dimensional construction of the annular treatment zone, on the one hand a uniform removal of the liquid over the whole cross section of the zone is obtained, and on the other hand, also by the applied force on the suspension, an acceptable friction between the packed crystal bed and the filters and the walls of the inner cylinder and the outer column is obtained. Further, a homogeneous build-up of the bed is facilitated and a very homogeneous flow is obtained, resulting in a uniform/even wash front.

According to a preferred embodiment of the invention, the ratio of the inner diameter of the column to the outer diameter of the cylinder is between 1.5 and 4. It is preferred to use a column having an inner diameter of at least 30 cm, whereas the upper value may be up to 450 cm.

In terms of operability, the wall to wall distance in the annular zone is an important consideration. This distance is preferably between 20 and 150 cm. At values lower than 20 cm, the advantages over the column according to U.S. Pat. No. 2,854,494 become rather small, whereas at values over 120 cm, problems with uniformity and pressure build-up may occur.

By careful selection of the size of the column, and the wall to wall distance of the annular zone, an annular hydraulic washing column can be constructed with a very good performance at high throughput at industrial scale, a feature which was not possible to obtain until the present invention.

As no excessively big forces need to be exercised on the bed of solids (crystal bed) in the device according to the invention, the crystal bed can be transferred exclusively by the presence of the passing liquid and the gravity. No separate mechanical means are used, contrary to the column disclosed in U.S. Pat. No. 3,319,437. In the column of this document the transport is obtained by the action of a piston, resulting in a discontinuous transport of the bed and discontinuous removal of washing liquid and product.

The use of continuous hydraulic transport of the bed diminishes a.o. deformation and damage of the crystals in the bed. The porosity of the crystal bed decreases in the direction of the filters and consequently also the force exercised by the liquid in axial direction of the bed. This force must be bigger than the opposing forces, mainly the friction and the back pressure of the wash liquid, if used. The force on the crystal bed is determined by the pressure drop of the liquid over the bed between the inlet of the suspension and the liquid removal through the filters. The pressure drop can be increased by extending the length of the bed or by increasing the flow rate of the liquid. If the suspension to be treated contains too little liquid to cause the desired pressure drop through the liquid on the crystal bed, a portion of the liquid passed through the filters can be recycled, as a result of which the pressure drop over the bed increases. In fact, this boils down to a decrease of the particle density of the suspension to be concentrated at the beginning of the concentration zone.

The treated (concentrated) suspension which has moved along the filters can be removed by resuspending and/or dissolving the solids, using mechanical or physical means. The mechanical means include a scraper, transport screw or other means, whereas the physical means may comprise turbulence (high pressure jets and the like), thermal treatment (melting zone) and the like.

The suspension concentrated in the apparatus according to the invention, which suspension has been treated in this apparatus with a liquid in co-current can then be treated in a washing zone in counter-current with another liquid. This washing zone can form a unit with the apparatus according to the invention described above, and be mounted between the filters of the concentration zone and the means for the removal of the concentrated suspension. In the washing zone the concentrated suspension is transferred in the same direction in which it moved in the concentration zone, while at the end of the washing zone, averted from the concentrated zone, a washing liquid is supplied which moves in countercurrent through the concentrated suspension. The washed concentrated suspension is preferably transported to a rinsing chamber where the concentrated and washed solid particles are again suspended in a liquid phase which is at the same time used as a washing liquid.

The liquid flow in the Hydraulic Annular Wash Column of the invention can be upwards or downwards. The choice herein depends on all aspects of the process, including but not limited to the nature of the liquid and solid material, the type of treatment, size and capacity of the column and the kind of method for breaking up the packed bed of solids.

In a further embodiment of the invention it can be contemplated to use the inside of the central cylinder to accommodate a further hydraulic washing column, either of conventional construction or in accordance with the present invention.

When the apparatus according to the invention is used for the separation of a mixture of substances by means of crystallization, a crystallizer is—seen in the direction in which the crystals move—positioned before the concentration zone, in which crystallizer the mixture to be separated, which is liquid in normal conditions, is partly crystallized, thus forming the crystal suspension which is supplied to the concentration zone. If the mixture of substances to be separated is solid in normal conditions, the crystal suspension can be prepared by partly melting this mixture.

The apparatus can be provided with means for a controlled dosage of washing liquid. The control signal is obtained by measuring the temperature, concentration etc in the washing zone or in the rinsing chamber. The dosage of the washing liquid can be controlled by adjusting the pressure of washing liquid in the rinsing chamber.

The location of the packed bed in the column can be determined by temperature measurements along the length of the column.

In the case of crystallization from a solvent whereby the crystals are separated out as a solid product, a saturated solution of pure product in a solvent can be used as washing liquid. It is then advantageous to adjust the washing liquid supply in such a way that a small flow rate of washing liquid flows through the entire washing zone and is removed through the filters.

If crystallization takes place from a melt, a so-called washing front occurs in the washing zone, i.e. the place where the temperature and the concentration gradients are maximal. The washing liquid supply is preferably controlled in such a way that this washing front is located in the washing zone between the filters and the device for removal of the concentrated suspension, preferably about halfway.

Should the washing front be located at or in the neighbourhood of the filters, these could get clogged up by crystal growth.

Further, a device can be mounted—seen in the direction of the movement of the crystals—after the washing zone, in which device the crystals or the crystal suspension removed from the washing zone, are molten and part of the melt is recycled as washing liquid to the washing zone.

Although the presence of a washing zone is preferred, it is important to note that certain applications of the invention do not require the presence of a washing step.

The invention is not only directed to the hydraulic annular washing column (HAWC), but also to the use thereof for treating suspensions, more in particular for concentrating them. In general the column of the invention may be used for concentrating, washing, impregnating, leaching, extracting and separating. It is possible to treat polluted soil (thereby extracting pollutants), to impregnate catalyst supports, to separate particles from suspensions, to leach minerals and ores, and so on.

More in particular the HAWC of the invention is suitable for concentrating by crystallisation, for example of beverages (coffee, juices), for desalination of (sea) water, for purification of organic materials, such as p-xylene, p-dichloro-nitrobenzene, p-dichloro-benzene, naphthalene and the like.

BRIEF DESCRIPTION OF THE DRAWINGS

The invention is now elucidated on the basis of the figures wherein.

These figures are not intended to limit the scope of the invention.

DETAILED DESCRIPTION

Figure 1:
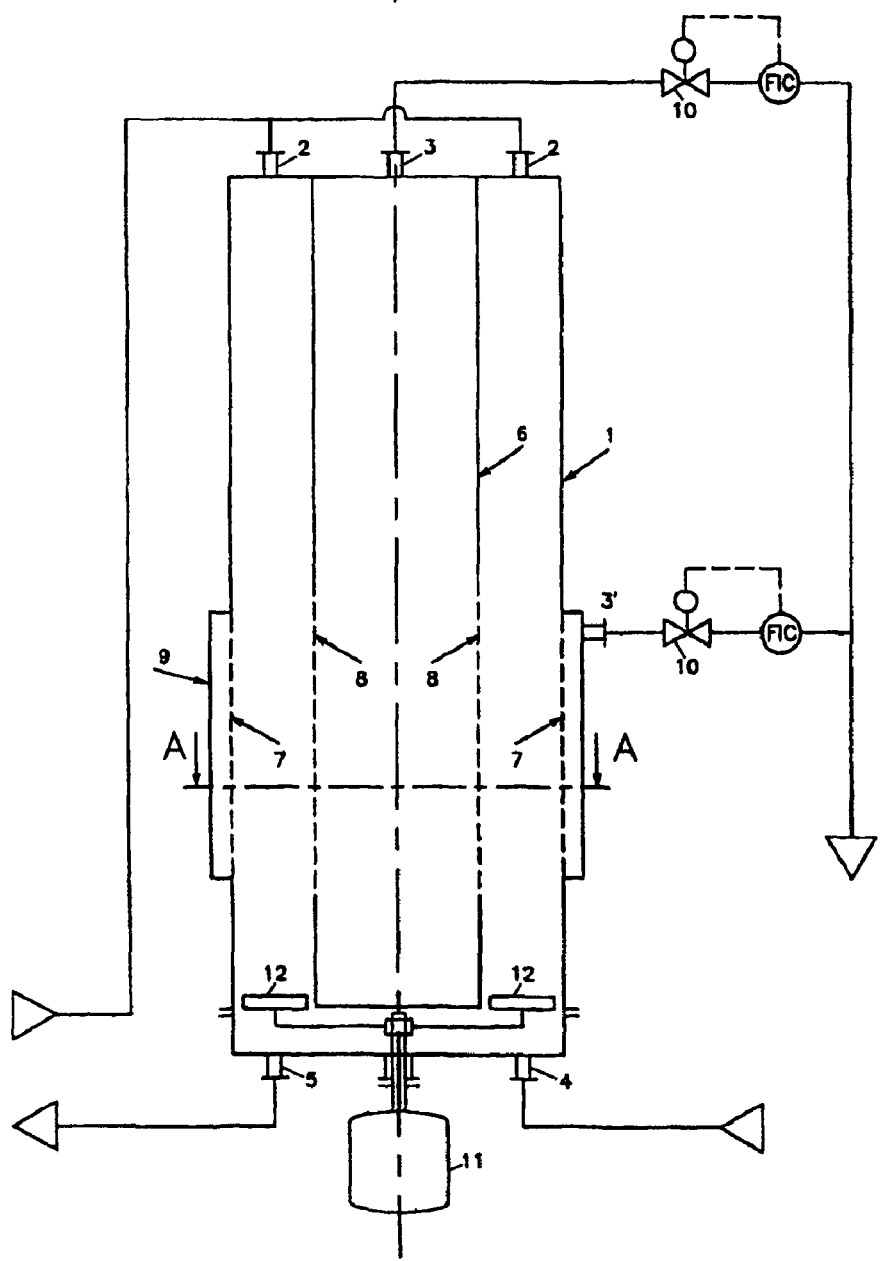
FIG. 1 shows a vertical cross-section of a column in accordance with the invention.

In FIG. 1, a hydraulic annular wash-column 1 is shown, having a suspension inlet 2, filtrate outlets 3 and 3', a wash liquid inlet 4, and a product slurry outlet 5. Inside column 1, coaxially with the column a central cylinder 6 is positioned, which is closed at the lower end and is connected with the filtrate outlet 3.

Both in the outer wall of the column 1, and in the cylinder, filters 7 and 8 are present. Around the column a filtrate chamber 9 is present, provided with filtrate outlet 3'. Flow controllers 10 and 10' are present in the lines from the filtrate outlets 3 and 3' to regulate the filtrate flow.

A scraper device 12 is present at the bottom of the zone formed by the outer column wall 1 and the cylinder 6, which scraper 12 is driven by a scraper driver 11.

Figure 2:
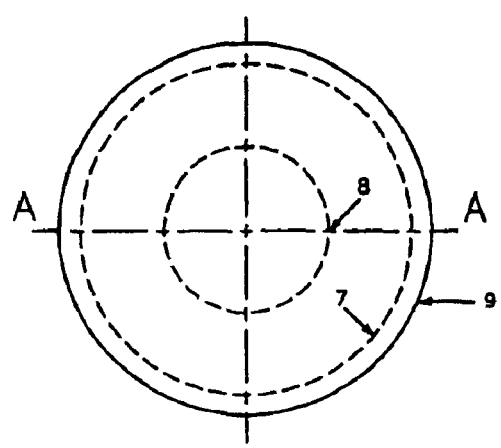
FIG. 2 gives a horizontal cross-section, along line A—A in FIG. 1.

FIG. 2 shows a horizontal cross-section along line A—A of FIG. 1, wherein the numbers have the same meaning as in FIG. 1.

When operating the column according to FIG. 1, a suspension of solids is fed to the column 1 through inlet(s) 2. In the lower part of the annular zone formed between the wall 1 and the cylinder 6, a packed bed forms. The liquid escapes through the filters 7 and 8, and from the inside of the cylinder 6 and the filter chamber 9, it flows through the outlets 3 and 3' via flow controllers 10 and 10' to a filtrate collection (not shown). Washing liquid is introduced through wash liquid inlet 4. The packed bed is resuspended at the bottom of the said zone, by a scraper 12 and the product slurry is removed through outlet 5.

What is claimed is:

1. Hydraulic annular washing column for continuously separating solids from a suspension comprising:

a hollow cylindrical column having a central axis therethrough, said column having an interior with a cross-section, perpendicular to said axis, that is constant along said axis, and that extends from a first end to a second end of said column;

one central cylinder axially disposed in said column and extending from said one end toward said opposite end, said central cylinder having an outer wall of constant diameter, said cylindrical column and said central cylinder defining an annular zone between them, extending axially from said first end of the column to at least near said second end of the column;

at least one filter in said outer wall of said central cylinder, forming the only direct communication between said annular zone and the interior of the cylinder and at least one filter in the outer wall of said hollow cylindrical column;

means for supplying a suspension to said first end of the column;

means for removing suspension at said second end of the column;

said annular zone defining a concentration zone and optionally a washing zone;

means communicating with the interior of said central cylinder for removing liquid passed through said filter in said outer wall of said central cylinder and means for removing liquid passed through filter in the outer wall of said hollow cylindrical column; and hydraulic means, continuously acting on the suspension for urging the liquid through said annular zone towards said filters and for forming a packed bed of solids moving continuously in an axial direction towards said second end.

2. Column according to claim 1, wherein two or more filters are present in said central cylinder or said outer wall, or both.

3. Column according to claim 1, wherein a ratio of an inner diameter of said column to an outer diameter of said cylinder is between 1.5 and 4.

4. Column according to claim 1, wherein a wall to wall distance of the annular zone is between 20 and 150 cm.

5. Column according to claim 1, wherein an inner diameter of said column is at least 30 cm.

6. Column according to claim 1, wherein one or more of the number, height and location of the filter(s) are used as design parameters for optimization of the wash front profile or to minimize the friction between the bed and said wall(s), or both.

7. Column according to claim 1, wherein one or more control valves are present to control the flow of liquid through the filters, thereby providing independent control of the liquid flow through the filters in said central cylinder and said outer wall.

8. Column according to claim 1, wherein either mechanical or physical means are present at said second end for disintegrating a packed bed of solids.

9. Column according to claim 8, wherein said mechanical means are selected from scrapers and screws.

10. Column according to claim 8, wherein said physical means include a liquid disintegration jet, or a melting zone.

11. Column according to claim 1, which column does not have mechanical means for transport of the packed bed through the column.

12. Process for continuously separating solids from suspension thereof in a liquid, said process comprising providing a suspension of solids in a liquid to a column according to claim 1, thereby forming a packed bed of said solids in said annular treatment zone, continuously withdrawing liquid from said suspension through said filters, and removing part of the packed bed at said second end of the column, the transport of the bed through the column being provided by gravity or hydraulic means, or both.

13. Process according to claim 12, wherein control of the flow of the liquid through the filters is used to regulate the friction between the packed bed and the filter-walls.

14. Process according to claim 12, wherein said suspension undergoes one or more of a concentrating, washing, impregnating, leaching, extracting and separating treatment.

15. Process according to claim 14, wherein the treatment comprises concentrating by crystallization of beverages, desalination of sea water or purification of organic materials.

16. A hydraulic annular washing column for continuously separating solids from a suspension, the column comprising:
a hollow cylindrical column having a central axis, a column wall and an interior that extends from a first end of the column to a second end;
one central cylinder axially disposed in said column and extending from said first end toward said second end, said central cylinder having a cylinder wall and a cylinder interior, said cylindrical column and said central cylinder defining an annular zone between them, the annular zone extending axially from the first end of the column to at least near the second end of the column;
at least one first filter in the central cylinder wall, said at least one first filter forming the only direct communication between said annular zone and the cylinder interior;
at least one second filter in the column wall;
a first inlet for supplying a suspension to said first end of the column;
a first outlet for removing product at said second end of the column;
a first filtrate outlet for removing liquid passed through said at least one first filter; and
a second filtrate outlet for removing liquid passed through said at least one second filter,
wherein the suspension is continuously urged through said annular zone and towards said filters without separate mechanical means.

17. The apparatus according to claim 16, further comprising a filtrate chamber connected to the column wall and configured to receive liquid passing through the at least one second filter, the filtrate chamber connected to said second filtrate outlet.

18. The apparatus according to claim 16, wherein at least two filters are present in either the cylinder wall, or the column wall, or both.

19. The apparatus according to claim 16, wherein a ratio of an inner diameter of said column to an outer diameter of said cylinder is between 1.5 and 4.

20. The apparatus according to claim 16, wherein a wall to wall distance of the annular zone is between 20 and 150 cm.

21. The apparatus according to claim 16, wherein an inner diameter of said column is at least 30 cm.

22. The apparatus according to claim 16, further comprising one or more control valves arranged to control a flow of liquid through the filters.

23. The apparatus according to claim 16, wherein mechanical or physical means are present at said second end for disintegrating a packed bed of solids.

24. The apparatus according to claim 23, wherein said mechanical means comprises scrapers, screws, or both.

25. The apparatus according to claim 24, wherein said physical means comprises a melting zone.

26. A process for continuously separating solids from suspension thereof in a liquid, said process comprising:
providing a column having first and second ends and a column wall, and a cylinder having a cylinder wall, the cylinder being axially located in the column so as to form an annular zone therebetween;
introducing a suspension of solids in a liquid into the annular zone near the first end of the column;
continuously withdrawing a first portion of said liquid through a first filter in said cylinder wall and continuously withdrawing a second portion of said liquid through a second filter in said column wall, thereby forming a packed bed in said annular zone; and
removing at least a portion of said packed bed at the second end of the column,
wherein the packed bed is transported through said annular zone without mechanical means.

27. The process according to claim 26, comprising controlling a flow of liquid through said first and second filters to regulate friction between the packed bed and walls of the filters.

28. The process according to claim 26, further comprising treating said suspension by one or more of concentrating, washing, impregnating, leaching, extracting and separating.

29. The process according to claim 28, wherein said treating comprises concentrating by crystallization.

* * * * *